Figure 4:
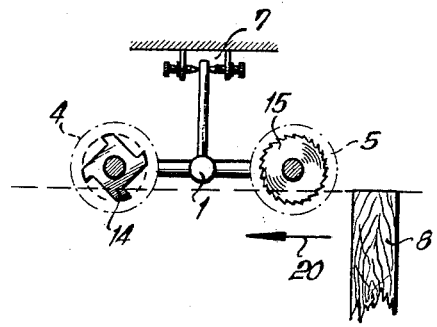

Jan. 8, 1963 F. WARMBRUNN 3,072,159
ROTATABLE TOOL HOLDER FOR EXCHANGEABLE TOOLS
Filed Feb. 21, 1961 2 Sheets-Sheet 1
FIG. 1
FIG. 2
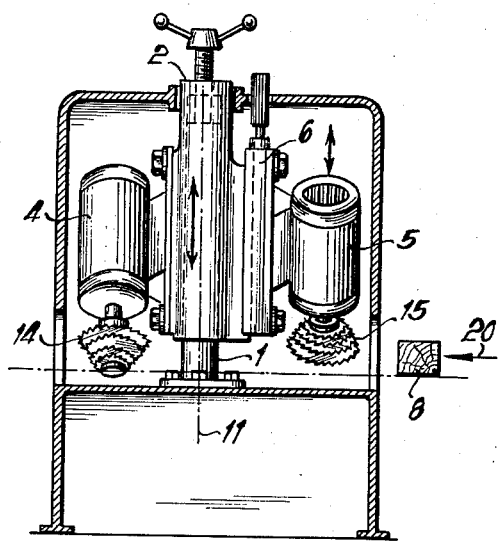
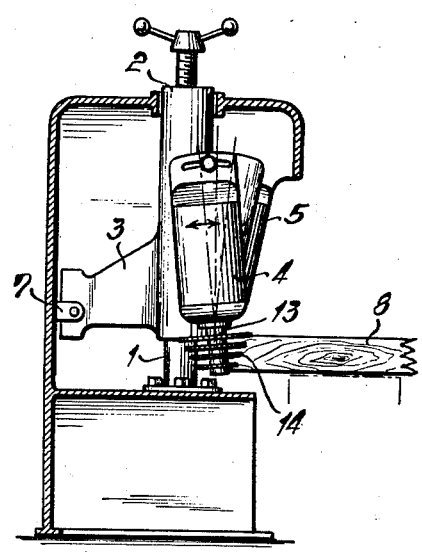
FIG. 3
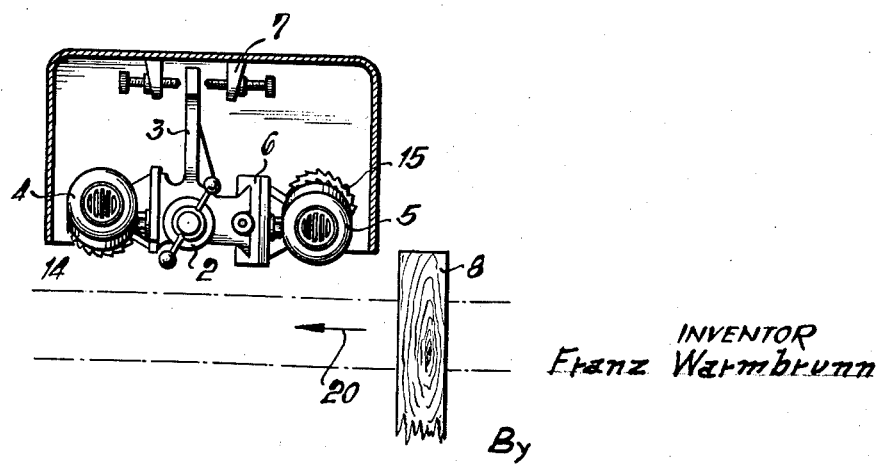
INVENTOR
Franz Warmbrunn
By
Watson, Cole, Grindle & Watson
Attys.

Jan. 8, 1963  F. WARMBRUNN  3,072,159
ROTATABLE TOOL HOLDER FOR EXCHANGEABLE TOOLS
Filed Feb. 21, 1961  2 Sheets-Sheet 2

INVENTOR
Franz Warmbrunn
By
Watson, Cole, Grindle + Watson
Attys.

United States Patent Office 3,072,159
Patented Jan. 8, 1963

3,072,159
ROTATABLE TOOL HOLDER FOR EXCHANGEABLE TOOLS
Franz Warmbrunn, Waldreshof, Upper Palatinate, Germany, assignor to Gunter Giesecke, Gerhard Giesecke, Karoline Giesecke, and Hermine Giesecke, trading as Hubel & Platzer, Tirschenreuth, Upper Palatinate, Germany, a German kommanditgesellschaft
Filed Feb. 21, 1961, Ser. No. 90,687
Claims priority, application Germany Feb. 26, 1960
6 Claims. (Cl. 144—1)

The invention relates to an apparatus for working wood or other materials which has a rotatably mounted tool holder for a number of exchangeable tools.

Apparatus and machines of this type as hitherto known are generally so constructed that the tools can be exchanged and adjusted only when the entire machine is stopped and production is interrupted. In addition, the adjustment of the tools, which also includes, for example, the adjustment of the working spindles in relation to one another and a common movement of the tool arbors in relation to the workpiece, involves a considerable expenditure of time, so that the replacement and adjustment of the tools necessitates a relatively long interruption of operation.

Machine tools comprising a turret are known in which only one tool occupies the operating position, the object of the turret being to bring a new sharpened tool into the operative position in place of a tool which has completed its service life, for the purpose of continuing the same working operation, or to bring another tool into the same working position for carrying out another operation.

It is proposed to obviate the disadvantages of the aforesaid known apparatus by means of the present invention, which has for its object to provide an apparatus of the type specified at the beginning in which more than one tool is situated in operating position at a time.

In order to achieve this object, it is proposed in accordance with the invention to make the rotatable tools so adjustable in relation to the tool holder that at least two tools simultaneously occupy operating positions.

The tool holder is preferably adapted to turn about a vertical axis and to be vertically adjustable. A preferred constructional form of the apparatus according to the invention having two tools or tool sets disposed diametrically in relation to the axis of rotation of the tool holder is obtained if the working spindle for one tool or one tool set is mounted directly on the tool holder, while the working spindle for the other tool is mounted on a supporting arm adjustable in relation to the tool holder in a direction parallel to the axis of rotation of the latter.

In an apparatus constructed in this manner, two like tools, for example milling cutters, may with advantage be replaceably mounted on the working spindles. If one milling cutter is then to be employed until it becomes blunt, it can be swiveled out of its operating position by turning of the tool holder without the operation of the apparatus having to be interrupted, while at the same time the other milling cutter occupies the operating position. The blunt tool can then be replaced by a new tool without production having to be interrupted. If desired, more than two working spindles or arbors may be provided on the same tool holder. In this case also, or even if only two working spindles are employed, different types of tools may with particular advantage be mounted on the working spindles in such manner that when the tool holder is rotated into an appropriate position, at least two of the said tools simultaneously occupy their operating positions, one of which tools may be, for example, a circular saw blade serving for pre-slotting, while the other tool, for example a milling tool, is thereby relieved of load. The chip-removing work is thus divided between two arbors and is substantially facilitated, especially in the case of milling cutters. The consumption of energy on the second operating arbor is thereby reduced inter alia, while at the same time the optimum feed advance of the workpieces is increased. In addition, the useful life of the tools is increased.

If, in accordance with a further feature of the invention, the working spindles or arbors, which are preferably disposed parallel or substantially parallel to the axis of rotation of the tool holder, are adapted to be rotated or angularly adjusted in each instance about an axis extending transversely to their longitudinal axis, dovetailing saws may also be employed.

Figure 5:
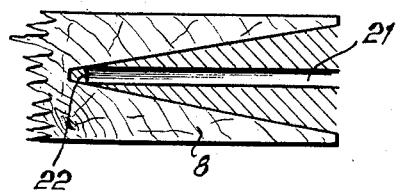
Figure 6:
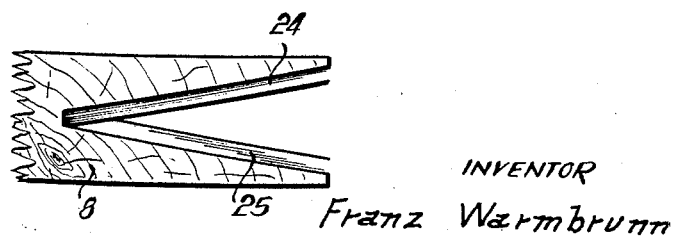

Further features of the invention will be apparent from the following description of the constructional form of the apparatus with two tools as illustrated by way of example in the drawings, in which:

FIGURE 1 is a diagrammatic view of the apparatus,
FIGURE 2 is a side elevation corresponding to FIGURE 1,
FIGURE 3 is the corresponding plan view,
FIGURE 4 illustrates an operative position of the apparatus, wherein two tools operate simultaneously, one tool consisting of a circular saw blade serving for the pre-slotting, while the other tool is a milling cutter, and
FIGURES 5 and 6 illustrate possible applications of the apparatus.

The illustrated apparatus consists of a central circular guide 1 on which there is rotatably and vertically adjustably mounted a tool holder 2 formed of a main rest.

The main rest is provided with an arm 3 for determining the swivelling angle.

The working spindle or arbor 4, illustrated to the left of the drawing, for the tool 14 is directly secured in a substantially vertical position. The working spindle or arbor 5, illustrated to the right, for the tool 15 is mounted on a supporting arm 6 which is so arranged on the main rest 2 on the side opposite to the arbor 4 as to be vertically adjustable. The two working spindles 4 and 5 can thus be vertically adjusted either in common or separately in accordance with the arrows shown in FIGURE 1. In addition, they can be swivelled as desired out of their vertical position, so that the tools may also be employed to saw dovetail as shown in FIGURE 2 if they are formed, for example, of circular saw blades. In this case also, the working spindles 4 and 5 are vertically adjustable in relation to one another with the aid of the supporting arm 6, independently of their setting in relation to the workpiece 8 which may be, for example, vertical or oblique.

Furthermore, as already mentioned, the whole working assembly may be vertically adjusted in relation to the workpiece with the aid of the main rest 2. The arm 3 locks the main rest 2 in its swivelled position by means of a setting device 7 formed, for example, of two set screws, as will be apparent from FIGURES 3 and 4. The various possible positions of the main rest 2, for example angular positions about the axis 11, can be set, as will be apparent, without the apparatus having to be placed out of operation. The arrow denoted by 20 in the drawing indicates the direction of feed of the workpiece 8.

In the application according to FIGURE 5, pre-slotting saws, which are disposed as a tool on the working spindle 4 to the left in FIGURES 1, 3 and 4, produce a narrow parallel slot 21 which, under optimum cutting conditions, should extend only so far into the dovetail base that an optimum chip thickness 22 of about 0.2 mm. is obtained in the dovetail base for the dovetail cutter disposed on the second working spindle 5.

Since the apparatus according to the invention permits not only a vertical adjustment of the working spindles 4 and 5 and thus of the tools 14 and 15 both separately and in common, as also a common pivot point, but also permits an inclination in relation to the vertical in accordance with FIGURES 2 and 3, it is possible to employ for the same purpose, instead of pre-slotting saws and dovetail cutters in the same machine, different types of tools, namely dovetailing saws. This application is illustrated in FIGURE 6. The narrow slot 24 is cut by the dovetailing saw on the working spindle 4 to the left in FIGURES 1, 3 and 4, and the narrow slot 25 is cut by the dovetailing saws disposed on the right-hand working spindle 5.

The application illustrated in FIGURES 5 and 6 is of great importance in that it has been found in practice that only dovetailing saws can be economically employed for certain cutting purposes, while only dovetail cutters with pre-slotting saws may be economically employed for other purposes.

I claim:

1. A machine for sawing and milling the ends of wooden workpieces comprising a frame, a central cylindrical guide mounted on and within the frame, a sleeve-like tool holder mounted on the guide for rotatable adjustment coaxially therewith and slidable thereon longitudinally relative to the axis of the guide, a spindle for a tool mounted for angular adjustment on the tool holder relative to the longitudinal axis of the guide, a supporting arm mounted on the tool holder on a side opposite to the side where the spindle is mounted, a second spindle for another tool mounted on the supporting arm, and means secured on the tool holder and cooperating with the frame to rotatably adjust the tool holder and its supporting arm and the spindles as a unit around the cylindrical guide as a center axis and hold the tool holder and its spindles in adjusted position along with the tools.

2. A machine according to claim 1, in which the means to adjust the tool holder of the guide includes an arm secured to the tool holder and a pair of spaced setting devices secured on the frame.

3. A machine according to claim 1, in which the central cylindrical guide is vertically mounted relative to the plane of operation on the work pieces.

4. A machine according to claim 1, in which an intermediate bearing is provided for the second-mentioned spindle and which is slidably mounted on the tool holder by a dovetail guide means to be vertically adjustable on the supporting arm parallel to the center axis of the cylindrical guide.

5. A machine according to claim 1, in which the means includes an arm on the tool holder and adjustable locking elements on the frame engaging said arm to secure the tool holder in adjusted position against rotation thereof on the cylindrical guide.

6. A machine according to claim 1, in which the second spindle is mounted for angular adjustment on the tool holder relative to the longitudinal axis of the guide.

References Cited in the file of this patent

UNITED STATES PATENTS

| 1,693,971 | Wagner | Dec. 4, 1928 |
| 1,765,987 | Marion | June 24, 1930 |
| 2,864,412 | Ponder | Dec. 16, 1958 |

FOREIGN PATENTS

| 28,934 of 1913 | Great Britain | Dec. 15, 1913 |
| 282,593 | Great Britain | Dec. 29, 1927 |